3,149,148
PROCESS FOR CONDENSATION REACTIONS
Martin Kladko, Loudonville, and Mark M. Lee, Bronx, N.Y., assignors to General Aniline & Film Corporation, New York, N.Y., a corporation of Delaware
No Drawing. Filed Jan. 2, 1962, Ser. No. 165,270
16 Claims. (Cl. 260—465)

This invention relates to a new and improved process for carrying out Knoevenagel type condensations wherein carbonyl compounds are reacted with active methylene compounds and in particular to the condensation of phenone compounds with cyanomethylene containing compounds.

It has been found that phenones condense with cyanomethylene compounds in the presence of a low boiling organic acid and ammonia to yield aryl substituted α-cyanoacrylic cmpounds which are outstanding as ultra-violet absorbers. In order to obtain acceptable yields of product the reaction must not only be catalyzed with acid and ammonium ions but removal of the water of reaction is mandatory. To effect this, a water immiscible inert, organic solvent is used as a reaction medium along with elevated temperatures whereby solvent and water are drawn off, as by boiling off. On a commercially acceptable scale the reactants along with solvent and catalyst are heated to reflux and the condensed vapors of solvent and water are separated and the solvent returned to the reaction vessel.

It has now been discovered that in order to achieve yields above about 90% and a rate of completion of above about 95% the refluxing vapors must be fractionated substantially free of organic acid (less than about 2% and preferably less than about 1%) whereby the condensed solvent which is then returned to the reaction vessel is in a substantially anhydrous condition. This is one essential and critical feature of the present process. The second critical feature of the process of this invention lies in maintaining a reflux ratio of at least about 2.7 grams/minute/gram mole of reactants.

By combining these two essential features, it becomes possible to obtain on a commercial scale yields of 90% or better with rates of completion of 95% or better. The yield is determined in the usual manner based upon reactants input and product output. The rate of completion is ascertained by its ultra-violet absorption characteristics of the final product.

Unless the process is carried out as outlined above, the yields are not only very poor but the product assays less than 75% (i.e. completion yield) and this is true regardless of the time of reaction. Thus, extended periods of reflux with constant removal of water fail to give an improvement in yield or rate of completion.

It is therefore an object of this invention to provide a new and improved process for carrying out condensation reactions.

It is another object of the present invention to provide a new and improved process for carrying out condensation reactions between carbonyl compounds and active methylene compounds and in particular between phenones and cyanomethylene compounds.

It is a further object of this invention to provide a new and improved process for condensing phenones with cyanomethylene compounds whereby improved yields are obtained.

It is a still further object of the present invention to provide a new and improved process for producing α-cyanoacrylic ultra-violet absorbers whereby outstanding yields of high quality product are obtainable.

Other objects will appear hereinafter as the description proceeds.

The general process involves the condensation of a phenone and a cyanomethylene compound in a water immiscible organic solvent and in the presence of a volatile organic acid and ammonium ions. It is necessary to maintain and assure the presence of such ions at all times during the reaction and this is preferably accomplished by constantly adding a source of ammonium ions so that it can be detected at all times. The preferred manner of supplying such ions is by the addition of anhydrous ammonia to the organic acid solution of reactants with solvent.

The reactants which are contemplated for use in the new and improved process of the present invention are phenone on the one hand and cyanomethylene compounds on the other hand.

The phenones which are employed to prepare the ultra-violet absorbers with which this invention is concerned have the following general formula:

wherein Ar is an aromatic, carbocyclic nucleus devoid of nuclear bonded amino groups and preferably mono or bicyclic and $R_1$ may be hydrogen, alkyl, alkenyl, substituted alkyl or alkenyl, aryl and substituted aryl.

The following specific substituents for $R_1$ are illustrative:

Alkyl of from 1 to about 30 carbon atoms e.g.:

| Methyl | n-Dodecyl |
| Ethyl | Stearyl |
| n-Propyl | Eicosyl |
| n-Butyl | Tricosyl |
| Isooctyl | Heptacosyl |
| n-Nonyl | Nonacosyl | and the like;

Alkenyl up to about 30 carbon atoms e.g.:

Allyl
Methallyl
Crotyl
Pentenyl-1
β-Ethyl-γ-propyl allyl
Decenyl-1
Octadecnyl and the like;

Substituted alkyl (alkyl as above) such as:

Cyanoalkyl e.g. cyanoethyl
Hydroxyalkyl e.g. hydroxyethyl
Chloroalkyl e.g. chloroethyl
Bromoalkyl e.g. bromoethyl
Fluoroalkyl e.g. fluoroethyl
Iodoalkyl e.g. iodoethyl
Alkoxyalkyls e.g. ethoxyethyl
Carbalkoxyalkyl e.g. carbomethoxyethyl
Aryloxyalkyl e.g. phenoxyethyl
Hydroxyalkoxyalkyl e.g. hydroxyethoxy-propyl and the like;

Substituted alkenyls such as:

2-chloroallyl
1-chlorobutenyl-(1)
2-chlorocrotyl
1,2-dibromopentenyl-(1)

and the like;

As suitable aryl substituents mention may be made of:

Phenyl
Tolyl
Xylyl
Cumyl
α-Naphthyl

β-Naphthyl
Diphenyl
Anisole
Phenetole
α-Anthraquinonyl
β-Anthraquinonyl
Phenanthranyl
1-methoxy phenanthranyl
α-Naphthyl methyl ether
α-Naphthyl ethyl ether
Halophenyl e.g.:
    Chlorophenyl,
      1,3-dichlorphenyl,
        1,3,5-trichlorophenyl
o-Chlorotolyl
m-Bromotolyl
Bromo-o-xylyl
α,β-Dichloronaphthyl
Carboxyphenyl
Carboxytolyls
Carboxyxylyls
Carbalkoxyphenyls e.g.: carbomethoxyphenyl
Carbalkoxytolyls
Acetophenyl
Propiophenyl
Stearoylphenyl
o-Acetotolyl
α-Benzoylnaphthyl
Hydroxyphenyl
Sulphamylphenyl and the like.

The cyanomethylene compounds which may be used have the general formula:

$$CNCH_2CZ$$

wherein Z is CN or OY and Y is hydroxy, alkoxy, substituted alkoxy, aryloxy, substituted aryloxy amino or mono or disubstituted amino. The cyanomethylene compounds are either malononitrite or cyanoacetic acid ester or amide derivatives. Of such esters and amides illustrative compounds include:

α-Cyanoacetic acid
Ethyl α-cyanoacetate
n-Propyl α-cyanoacetate
Methyl α-cyanoacetate
2-ethyl hexyl α-cyanoacetate
Dodecyl α-cyanoacetate
Benzyl α-cyanoacetate
Phenyl α-cyanoacetate
Hydroxyethyl α-cyanoacetate
Chloroethyl α-cyanoacetate
Methoxyethyl α-cyanoacetate
α-Cyanoacetamide
α-Cyano-N,N-dimethyl acetamide
p-Chlorophenyl α-cyanoacetate, and the like.

Illustrative of the phenones which may be used are the following:

2-methylbenzophenone
3-methylbenzophenone
4-methylbenzophenone
2-chlorobenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzophenone
Benzophenonecarboxylic acid(2)
Benzophenonecarboxylic acid(3)
Benzophenonecarboxylic acid(4)
2-benzoylbenzoic acid methyl ester
2-benzoylbenzoic acid ethyl ester
2-benzoylbenzoic acid amide
2-benzoylbenzoic acid monoethyl amide
3-benzoylbenzoic acid methyl ester
3-benzoylbenzoic acid ethyl ester
4-benzoylbenzoic acid methyl ester
4-benzoylbenzoic acid ethyl ester
2-sulfonamidebenzophenone
4-sulfonamidebenzophenone
4-ethylbenzophenone
2,4-dimethylbenzophenone
2,5-dimethylbenzophenone
3,4-dimethylbenzophenone
2,4'-dimethylbenzophenone
3,4'-dimethylbenzophenone
4,4'-dimethylbenzophenone
4-propylbenzophenone
4-isopropylbenzophenone
2,4,5-trimethylbenzophenone
2,4,6-trimethylbenzophenone
2,4,2'-trimethylbenzophenone
2,4,3'-trimethylbenzophenone
2-methyl-5-isopropylbenzophenone
2,3,4,6-tetramethylbenzophenone
2,3,5,6-tetramethylbenzophenone
2,4,2',4'-tetramethylbenzophenone
2,5,2',5'-tetramethylbenzophenone
2,4,3',4'-tetramethylbenzophenone
2,4,6,3',5'-pentamethylbenzophenone
2,2'-dimethyl-5,5'-di-isopropylbenzophenone
4-n-octylbenzophenone
4-cyclohexylbenzophenone
2-benzoylbenzophenone
4,4'-dicyclohexylbenzophenone
4,4'-di-p-toluylbenzophenone
2-phenylbenzophenone
3-phenylbenzophenone
4-phenylbenzophenone
2-propenylbenzophenone
2-allylbenzophenone
N,N-dimethyl-2-sulfonamidebenzophenone
4-phenethylbenzophenone
2-carboxamidobenzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)benzophenone
4-(p-tolyloxy)benzophenone
4-isopentyloxybenzophenone
2-acetoxybenzophenone
3-acetoxybenzophenone
4-acetoxybenzophenone
4-cyclohexyloxybenzophenone
4-benzyloxybenzophenone
4,4'-difluorobenzophenone
2,4-dibromobenzophenone
2,6-dibromobenzophenone
2,4'-difluorobenzophenone
2,2'-dibromobenzophenone
2,4'-dibromobenzophenone
3,3'-dibromobenzophenone 4,4'-dibromobenzophenone
4,4'-dichlorobenzophenone
2,4-dichlorobenzophenone
2,4'-dichlorobenzophenone
3,4-dichlorobenzophenone
4,4'-di-iodobenzophenone
3,5-di-iodobenzophenone
4-chloro-4'-bromobenzophenone
2,2'-di-iodobenzophenone
2,4-dichloro-2',4'-dibromobenzophenone
2,4,6-tribromobenzophenone
2,4,6-trichlorobenzophenone
2,5,2',5'-tetrachlorobenzophenone
2,4,2',4'-tetrachlorobenzophenone
2-bromo-4'-phenylbenzophenone
2-chloro-4'-phenylbenzophenone
2-bromo-2',4,4',6,6'-pentamethylbenzophenone
2-hydroxy-5-octylbenzophenone
4-chloro-3',4'-dimethylbenzophenone
4-chloro-3,4'-dimethylbenzophenone
2-chloro-2',4'-dimethylbenzophenone
2'-bromo-4-methylbenzophenone
2-hydroxy-4-methylbenzophenone
4-hydroxy-2-methylbenzophenone
4-hydroxyethoxybenzophenone
3-hydroxy-4-methoxybenzophenone
2-hydroxy-4-methoxy-3-methylbenzophenone
4'-methoxy-2-methylbenzophenone
4-methoxy-3-methylbenzophenone
6-methoxy-3-methylbenzophenone
6-hydroxy-3-methylbenzophenone
4-methoxy-2-methylbenzophenone
4,4'-dimethoxybenzophenone
4,4'-diethoxybenzophenone
4',4'-di-isopropoxybenzophenone
2,2'-dimethoxybenzophenone
2,3-dimethoxybenzophenone
2,4'-dimethoxybenzophenone
4-methoxy-2,5-dimethylbenzophenone
4-hydroxy-2,5-dimethylbenzophenone
2-hydroxy-3,5-dimethylbenzophenone
5-hydroxy-2,4-dimethylbenzophenone
5-methoxy-2,4-dimethylbenzophenone
5-ethoxy-2,4-dimethylbenzophenone
4-methoxy-3-methyl-6-isopropylbenzophenone
4-hydroxy-3-methyl-6-isopropylbenzophenone
4-hydroxy-2-methyl-5-isopropylbenzophenone
4-acetoxy-2-methyl-5-isopropylbenzophenone
4-acetoxy-3-methyl-5-isopropylbenzophenone
3-ethoxy-3',4,4'-trimethoxybenzophenone
4-ethoxy-3,3',4'-trimethoxybenzophenone
4-(p-methoxyphenyl)-4'-phenylbenzophenone
4,4'-bis(p-methoxyphenoxy)benzophenone
4-(p-hydroxyphenyl)benzophenone
4-(p-methoxyphenyl)benzophenone
4-methoxy-3,5-dimethylbenzophenone
6-ethoxy-3-methylbenzophenone
3-chloro-4(2-hydroxyethoxy)benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4-fluoro-2-methylbenzophenone
4'-bromo-4-hydroxybenzophenone
4'-bromo-4-ethoxybenzophenone
3-iodo-4-methoxybenzophenone
3-iodo-4-hydroxybenzophenone
4'-iodo-4-ethoxybenzophenone
5-chloro-2-hydroxy-4-methylbenzophenone
3'-chloro-2-hydroxy-4-methylbenzophenone
3'-chloro-4-hydroxy-3-methylbenzophenone
3'-chloro-4-methoxy-3-methylbenzophenone
5'-chloro-2'-methoxy-3-methylbenzophenone
5'-iodo-2-hydroxy-3-methylbenzophenone
2'-iodo-6-hydroxy-3-methylbenzophenone
5-iodo-6-hydroxy-3-methylbenzophenone
3'-iodo-4-methoxy-2-methylbenzophenone
3'-iodo-4'-hydroxy-2-methylbenzophenone
5'-iodo-2'-methoxy-2-methylbenzophenone
5'-iodo-2'-hydroxy-2-methylbenzophenone
4'-bromo-6-hydroxy-3-methylbenzophenone
2'-bromo-6-hydroxy-3-methylbenzophenone
2'-bromo-6-methoxy-3-methylbenzophenone
2-chloro-2'-bromo-4-hydroxybenzophenone
3,5-dibromo-4-hydroxybenzophenone
3,5-dibromo-4-ethoxybenzophenone
3,5-di-iodo-4-hydroxybenzophenone
3,5-dichloro-2,2',4,6' - tetramethoxy-4' - methylbenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
4-tertiarybutyl-2'-isopropenyl - 2,3,5,6 - tetramethylbenzophenone
2,2'-dihydroxy-4,4'-dipropoxybenzophenone
2,5-dimethoxy-3,4-dimethylbenzophenone
4,4'-dimethoxy-3,3'-dimethylbenzophenone
2,6-dimethoxy-2'-methylbenzophenone
2,6-dimethoxy-3'-methylbenzophenone
3,3'-diethoxy-4,4'-dimethoxybenzophenone
3,3'4,4',5,5'-hexamethoxybenzophenone
2,2'-dihydroxy-4,4'-bis(octyloxy)benzophenone
2,2'-dihydroxy-4,4'-bis(hexyloxy)benzophenone
3,3'-dimethoxy-4,4'-bis(benzyloxy)benzophenone
2'-hydroxyacetophenone (2-hydroxyacetophenone)
4'-hydroxyacetophenone (4-hydroxyacetophenone)
4'-methoxyacetophenone
4'-ethoxyacetophenone
4'-n-propoxyacetophenone
2'-alloxy-5'-bromoacetophenone
2-bromo-4'-methoxyacetophenone
2'-allyloxybutyrophenone
4'-butoxy-2'-methylbutyrophenone
3'-bromo-4'-methoxybutyrophenone
3'-chloro-4'-ethoxybutyrophenone
2',5'-dimethyl-4'-propoxybutyrophenone
4'-ethoxy-3'-methylbutyrophenone
4'-ethyl-2'-hydroxy-6'-methylbutyrophenone
2'-isopentyloxy-5'-methylbutyrophenone
2'-methyl-4'-propoxybutyrophenone
4'-methoxy-3'-phenylbutyrophenone
2'-hydroxy-5'-methyloctanophenone
4-n-dodecyloxyacetophenone
4-benzyloxyacetophenone
4'-phenoxyacetophenone
2',3'-dimethyl-4'-hydroxyacetophenone
3'-bromo-4'-hydroxyacetophenone
3'-bromo-5'-fluoro-2'-hydroxyacetophenone
3'-allyl-4'-hydroxyacetophenone
3'-allyl-2'-hydroxyacetophenone
3'-allyl-2'-hydroxy-5'-methylacetophenone
5'-ethyl-2'-hydroxybutyrophenone
4'-hydroxyoctanophenone
4'-hydroxyhexanophenone
5'-methyl-2'-(p-tolyloxy)acetophenone
4'-(p-hydroxyphenoxy)acetophenone
2'-hydroxy-4'-pentadecylacetophenone
2'-hydroxy-3'-methylacetophenone
2'-hydroxy-4'-methylacetophenone
2'-hydroxy-5'-methylacetophenone
3'-hydroxy-4',5'-dimethylacetophenone
3',5'-dibromo-4'-hydroxymethylbutyrophenone
2'-hydroxycrotonophenone
4'-hydroxycrotonophenone
4'-ethoxymethylcrotonophenone
2'-hydroxypentenophenone 5'-chloro-2'-hydroxycrotonophenone
4'-methoxy-3-methyl-2-pentenophenone
4'-methoxy-2-hexenophenone
3'-tert.butyl-3'-chloro-2'-hydroxypentenophenone
2'-hydroxy-4',5'-dimethylpentenophenone
2'-methoxy-4-heptenophenone
2'-methoxy-6-heptenophenone
2'-methoxy-2-octenophenone
3'-methyl-4'-methoxy acetophenone
3'-ethyl-4'-methoxy acetophenone
3'-butyl-4'-methoxy acetophenone
3'-allyl-4'-methoxy acetophenone
4'-butoxy-3'-methyl acetophenone
4'-isopentyloxy-3'-methyl acetophenone
3'-hexyl-4'-methoxy acetophenone
3'-lauryl-4'-methoxy acetophenone
3'-methyl-4'-ethoxy acetophenone
3'-butyl-4'-ethoxy acetophenone
3'-iso-octyl-4'-ethoxy acetophenone
3'-decyl-4'-ethoxy acetophenone
3'-methyl-4'-n-propoxy acetophenone
3'-iso-amyl-4'-n-propoxy acetophenone
3'-stearyl-4'-n-propoxy acetophenone
3'-methyl-4'-phenoxy acetophenone
3'-methyl-4'-benzyloxy acetophenone
3'-methyl-4'-allyloxy acetophenone
3'-methyl-4'-methoxy-2-pentenophenone
3'-ethyl-4'-methoxy-propiophenone
3'-n-butyl-4'-methoxy-propiophenone
3'-n-butyl-4'-n-propoxy-propiophenone
3'-methyl-4'-methoxy-butyrophenone
3'-methyl-4'-allyloxy-butyrophenone
3'-methyl-4'-phenoxy-butyrophenone
3'-ethyl-4'-(p-chlorobenzyloxy)-butyrophenone
3'-pentadecyl-4'-methoxy-butyrophenone
4'-methoxy-3'-methyl-α-phenyl acetophenone
4'-butoxy-3'-methyl-butyrophenone
4'-isopentyloxy-3'-methyl-butyrophenone
ω-Methoxy acetophenone
ω-Ethoxy acetophenone
ω-cyclohexyloxy acetophenone
ω-Phenoxy acetophenone
2-phenacyloxy benzyl bromide
2-phenacyloxy benzyl alcohol
ω-Acetoxy acetophenone
4-chloro-ω-hydroxy acetophenone
4-bromo-ω-hydroxy acetophenone
4-bromo-ω-acetoxy acetophenone
β-Isopropyl-acrylic acid (4-bromophenacyl ester)
4-iodo-ω-hydroxy acetophenone
4-iodo-phenacylcaprylate
ω-Butyl mercapto-acetophenone
α-Bromo-6-methylmercapto-3-methyl propiophenone
α,β-Dibromo-6-acetoxy-3-methyl butyrophenone
α-Acetoxy-2,5-dimethyl isobutyrophenone
2-hydroxy-1-benzoyl-propene-(1)
2-ethoxy-1-benzoyl-propene-(1)

Specific compounds which may be prepared include, as illustrative, the following:

Ethyl α-cyano-β-methyl-4-hydroxycinnamate
Ethyl α-cyano-β-methyl-4-methoxycinnamate
Ethyl α-cyano-β-methyl-4-(n-dodecyloxy) cinnamate
N,N-dimethyl α-cyano-β-methyl-2-hydroxycinnamide
Ethyl α-cyano-β-methyl-4-phenylcinnamate
Ethyl-α-cyano-β-methyl-4-benzyloxycinnamate
α-Cyano-β-methyl-4-hydroxycinnamide
Phenyl α-cyano-β-methyl-4-hydroxycinnamate
Ethyl α-cyano-β-octadecylcinnamate
α-Methyl-4-methoxybenzylidenamalononitrile
α-Methyl-4-hydroxybenzylidenamalononitrile
α-Methyl-4-n-dodecyloxybenzylidenamalononitrile
α-Ethyl-4-hydroxybenzylidenemalononitrile
α-Methyl-4-phenylbenzylidenemalononitrile
α-Octadecyl-4-methoxybenzylidenamalononitrile Ethyl α-cyano-β,β-diphenylacrylate
Ethyl α-cyano-β,β-bis(4-chlorophenyl)acrylate
Ethyl α-cyano-β-phenyl-β-(4-n-dodecyloxphenyl)acrylate
Methyl α-cyano-β-(2-chlorophenyl)-β-(4-chlorophenyl) acrylate
Ethyl α-cyano-β-phenyl-β-(4-methoxyphenyl)acrylate
Ethyl α-cyano-β,β-bis(p-tolyl)acrylate
Phenyl α-cyano-β,β-diphenylacrylate
Ethyl α-cyano-β,β-bis(4-hydroxyphenyl)acrylate
Ethyl α-cyano-β-phenyl-β-(4-biphenyl)acrylate
α-Cyano-β,β-diphenylacrylamide
N,N-dimethyl-α-cyano-β,β-diphenylacrylamide
Ethyl α-cyano-β-phenyl-β-(2-sulfamylphenyl)acrylate
Diphenylmethylenemalononitrile
Di(4-chlorophenyl)methylenemalononitrile
Phenyl-4-n-dodecyloxyphenylmethylenemalononitrile
4-(chlorophenyl)-4'-(methoxyphenyl)methylenemalononitrile
2,4'-di(chlorophenyl)methylenemalononitrile
Phenyl-4-(methoxyphenyl)methylenemalononitrile
Di-4-tolylmethylenemalononitrile
Phenyl-(4-biphenyl)methylenemalononitrile
Di(4-hydroxyphenyl)methylenemalononitrile
Di(4-methoxyphenyl)methylenemalononitrile
Ethyl-α-cyano-β-(4-methoxyphenyl)-β-(3,4-xylyl)acrylate
Phenyl-5,6,7,8-tetrahydro-2-naphthylmethylenemalononitrile
Di(p-anisyl)methylenemalononitrile
Methyl-(4-methoxy-3-methylphenyl)methylenemalononitrile
Octyl-α-cyano-β,β-diphenylacrylate
Methyl-α-cyano-β-methyl-p-methoxycinnamate
Methyl-α-cyano-β-methyl-4-hydroxycinnamate
Methyl-α-cyano-β-methyl-4-ethoxycinnamate
n-Propyl-α-cyano-β-methyl-4-hydroxycinnamate
n-Propyl-α-cyano-β-methyl-4-methoxycinnamate
Isopropyl-α-cyano-β-methyl-4-ethoxycinnamate
n-Butyl-α-cyano-β-methyl-4-methoxycinnamate
Ethyl-α-cyano-β-n-propyl-4-methoxycinnamate
Phenyl-α-cyano-β-n-butyl-4-methoxycinnamate
Benzyl-α-cyano-β-methyl-4-methoxycinnamate
Benzyl-α-cyano-β,β-diphenylacrylate
Benzyl-α-cyano-β,β-bis(4-chlorophenyl)acrylate As pointed out above, the first of the two critical features of this invention lies in removing from the refluxing vapors a substantial portion of the organic acid so that in the condensed effluent liquid the water content of the organic solvent is held to a maximum of about 0.1%. This is accomplished by maintaining the acid concentration of the condensed liquids below about 2%.

Any combination of solvent and acid may be used provided that the acid is one of the lower fatty acids boiling below about 165° C. (i.e. acetic, propionic or butyric acid) and the selected solvent, which is a water-immiscible one, boils below the selected acid. Suitable solvents include:

Benzene
Toluene
Xylene
Pentane
Hexane
Heptane
Nonane
Chloroform
Carbontetrachloride
Ethylene dichloride
Ethylene dibromide
Propyl bromide
Propyl chloride
1,1-dibromopropane
1,2-dibromopropane
1,1-dichloropropane
n-Butyl bromide
n-Butyl chloride n-Amyl bromide
n-Amyl chloride
n-Hexyl chloride
2-Chlorohexane
3-Ethyl hexane
2-methyl hexane
3-Methyl hexane
n-Heptyl chloride, iso-octane
3-Methyl heptane
4-Methyl heptane
Biisoamyl, and the like.

The preferred acid is acetic acid and the preferred solvent is benzene.

The following examples will serve to illustrate the present invention without being deemed limitative thereof. Parts are by weight unless otherwise indicated.

*Example 1*

Equipment.—10 l. flask; 2″ diameter, 6′ high packed column; Aufhauser trap on column; water cooled condenser on Aufhauser trap.

To the 10 l. flask there is added 2400 cc. of benzene, 1000 cc. of glacial acetic acid; 1820 g. of benzophenone and 1440 cc. of ethylcyanoacetate. The charge is heated to 60° C. to dissolve the benzophenone. 10 g. of anhydrous ammonia is added under the surface during a ½ hr. period. The charge is heated to boiling whereupon the vapors fill up the packed column, the Aufhauser trap and flow back into the top of the packed column. The heat is adjusted with a Variac so that the reflux is approx. 50–60 cc./min. The temperature of the liquid is adjusted by addition of benzene or acetic acid to 100–103° C., benzene addition lowering the boiling point and acetic acid raising it. Over 40 hours 55 g. of anhydrous ammonia is metered in under the surface at such a speed that the rate of addition is 1.38 g./hour. The reflux rate is kept within the specified limits and water is periodically drawn off the Aufhauser. After 48 hours, the benzene is steam distilled off and the water layer separated. 4000 cc. of isopropanol is added and the charge heated to 75° C. It is clarified by Nucharing and filtering. It is slowly cooled to 5° C., filtered, washed with 1000 cc. of cold isopropanol and dried. The degree of completion of the reaction is 95% by UV determination. An actual yield of 90% is obtained, some product remaining in the mother liquor which may be reused in the next batch to augment the yield of the next batch.

The benzene layer from the Aufhauser trap which is returned to the flask contains less than 0.1% water and about 1% acetic acid. The water drawn off periodically combines about 12% acetic acid and nil benzene. While it would appear that 12% acetic acid in the water drawn off is contra-indicative of what has ben stated above, i.e. to reduce the acid condensation of the refluxing vapors and consequent condensed liquid to preferably less than about 1%, actually due to the ratio of the volumes of benzene and water (200 to 1) condensed, the 12% acid represents about 0.06% acid based upon total liquids condensed. The reflux rate stated above is about 4.4 to 5.3 grams/minute/gram-mole.

*Example 2*

This example represents a typical plant run.

Equipment.—500 gal. stainless steel jacket kettle; stainless steel packed column 15⅝″ in diameter, 8′ high packed with 1⅓″ procelain Intalox saddles; 100 sq. ft. stainless steel condenser; decanter (phase separator).

The kettle is charged with 1055 lbs. of benzene, 490 lbs. of glacial acetic acid, 910 lbs. of benzophenone and 763 lbs. of ethylcyanoacetate. It is stirred and heated to 60° C. to dissolve the benzophenone. The manhole of the kettle is closed. 5 lbs. of anhyd. ammonia is added from a cylinder in ½ hr. The kettle contents are heated to the boil. The benzene from the condenser will flow from the decanter, then through a rotameter and into the top of the packed column. The steam is adjusted so that the reflux rotameter reads 3.7–4.0 gal./min. The water is periodically drained from the bottom of the decanter to a drum. The kettle temperature is held at 100–103° C., and should be adjusted to same by addition of benzene to lower the boiling point or acetic acid to raise it. Four hours after the initial ammonia addition, 25 lbs. of anhyd. ammonia is metered in over a 40 hr. period, at a rate of 0.63 lbs./hr. After 48 hrs. the benzene is distilled off with open steam, then the water layer is separated off. 1750 lbs. of isopropanol are added and the temperature raised to 75° C. to solution. Filter-aid is added and the charge clarified through a Sparkler filter, receiving the clear solution in a 750 gal. enamel kettle. The charge is stirred for 6 hours, allowing to cool slowly; then it is cooled for 2 hrs. with cold water on the jacket, then with brine to a temperature of 5° C. The charge is filtered on a filter pressure, washed with 480 lbs. of isopropanol, the cake discharged and dried under vacuum at 75° C. The mother liquor is recovered for reuse for the next batch. The degree of reaction completion by UV determination is 95%. An actual yield of 90% is obtained.

The reflux rate above stated is again about 5.4 grams/minute/gram-mole.

*Example 3*

Example 2 is repeated using a reflux rate of 2.7 grams/minute/gram-mole. The yield is about the same with the degree of reaction completion about 90%.

*Example 4*

Example 2 is again repeated using a reflux rate of 1.35 grams/minute/gram-mole. The yield is less than 70% and the degree of completion of reaction is less than 75%.

*Example 5*

Examples 2 and 3 are repeated using the indicated ketone:

A. 4,4′-dichlorobenzophenone
B. 2,4′-dichlorobenzophenone
C. 4-methoxybenzophenone
D. 4,4-dimethylbenzophenone
E. 4,4′-dihydroxybenzophenone
F. 2-sulfamylbenzophenone
G. 4-phenylbenzophenone

*Example 6*

Example 5 is repeated except that in place of ethyl cyanoacetate the following cyano compounds are used:

A. Malononitrile
B. Cyanoacetamide
C. N,N-dimethyl cyanoacetamide
D. Phenyl cyanoacetate
E. Methyl cyanoacetate

*Example 7*

Example 1 is repeated using propionic acid. The temperature is held to 105–110° C.

*Example 8*

Example 1 is repeated using butyric acid holding the temperature as in Example 1 to 110–115° C. by adding benzene or acid as necessary.

*Example 9*

Example 1 is repeated using toluene in place of benzene. The temperature is held to 120–125° C.

*Example 10*

Example 1 is repeated using n-hexane. The temperature is held to 85–90° C.

Other variations in and modifications of the described processes which will be obvious to those skilled in the art can be made in this invention without departing from the scope or spirit thereof.

We claim:

1. A process for producing an α-cyanoacrylic compound which comprises refluxing in a reaction zone
   (1) a phenone with
   (2) a cyanomethylene compound in the presence of
      (A) an inert organic acid having a boiling point below about 165° C.,
      (B) ammonium ions,
      (C) a water-immiscible, inert, organic solvent boiling below the acid,
the production of said α-cyanoacrylic compound being catalyzed by said inert organic acid and ammonium ions, fractionating the refluxing vapors to less than about 3% acid while maintaining a reflux rate of at least about 2.7 grams/minute/gram-mole of reactants, condensing the said refluxing vapors and returning condensed organic solvent in a substantially anhydrous condition to said reaction zone.

2. A process for producing an α-cyanoacrylic compound which comprises refluxing in a reaction zone
   (1) a phenone with
   (2) a cyanomethylene compound in the presence of
      (A) acetic acid,
      (B) ammonium ions,
      (C) a water-immiscible, inert, organic solvent boiling below the acid,
the production of said α-cyanoacrylic compound being catalyzed by said acetic acid and ammonium ions, fractionating the refluxing vapors to less than about 3% acid while maintaining a reflux rate of at least about 2.7 grams/minute/gram-mole of reactants, condensing the said refluxing vapors and returning condensed organic solvent in a substantially anhydrous condition to said reaction zone.

3. A process for producing an α-cyanoacrylic compound which comprises refluxing in a reaction zone
   (1) a phenone with
   (2) a cyanomethylene compound in the presence of
      (A) acetic acid,
      (B) ammonium ions,
      (C) benzene,
the production of said α-cyanoacrylic compound being catalyzed by said acetic acid and ammonium ions, fractionating the refluxing vapors to less than about 3% acid while maintaining a reflux rate of at least about 2.7 grams/minute/gram-mole of reactants, condensing the said refluxing vapors and returning condensed benzene in a substantially anhydrous condition to said reaction zone.

4. A process as defined in claim 1 wherein the α-cyanoacrylic compound is ethyl α-cyano-β,β-diphenylacrylate, the phenone is benzophenone and the cyanomethylene compound is ethyl α-cyanoacetate.

5. A process as defined in claim 1 wherein the phenone is benzophenone and the cyanomethylene compound is cyanoacetamide.

6. A process as defined in claim 1 wherein the phenone is benzophenone and the cyanomethylene compound is malononitrile.

7. A process as defined in claim 1 wherein the phenone is benzophenone and the cyanomethylene compound is phenyl α-cyanoacetate.

8. A process as defined in claim 3 wherein the phenone is benzophenone and the cyanomethylene compound is ethyl α-cyanoacetate.

9. A process as defined in claim 3 wherein the phenone is an alkyl phenyl ketone.

10. A process as defined in claim 9 wherein the phenone is acetophenone.

11. A process as defined in claim 10 wherein the cyanomethylene compound is ethyl α-cyanoacetate.

12. A process as defined in claim 1 wherein the organic acid is propionic acid.

13. A process as defined in claim 1 wherein the organic acid is butyric acid.

14. A process as defined in claim 2 wherein the organic solvent is toluene.

15. A process as defined in claim 2 wherein the organic solvent is n-hexane.

16. A process as defined in claim 3 wherein the ammonium ions are supplied by ammonia added to the acetic acid.

References Cited in the file of this patent

UNITED STATES PATENTS 2,839,402    Edwards et al. _____ Feb. 4, 1952

OTHER REFERENCES

McElvain: Journal of the American Chemical Society, 1958, vol. 80, page 3919.

UNITED STATES PATENT OFFICE
CERTIFICATE OF CORRECTION

Patent No. 3,149,148                          September 15, 1964

Martin Kladko et al.

It is hereby certified that error appears in the above numbered patent requiring correction and that the said Letters Patent should read as corrected below.

Column 10, line 31, for "1,35" read -- 1.35 --; line 41, for "D. 4,4-dimethylbenzophenone" read -- D. 4,4′-dimethylbenzophenone --.

Signed and sealed this 16th day of February 1965.

SEAL)
Attest:

ERNEST W. SWIDER                                    EDWARD J. BRENNER
Attesting Officer                                        Commissioner of Patents